(12) United States Patent
Saito et al.

(10) Patent No.: US 7,661,506 B2
(45) Date of Patent: Feb. 16, 2010

(54) MOTOR-DRIVEN STEERING APPARATUS

(75) Inventors: Mitsuo Saito, Tochigi (JP); Koichi Hata, Tochigi (JP)

(73) Assignee: Showa Corporation, Saitama (JP)

( * ) Notice: Subject to any disclaimer, the term of this patent is extended or adjusted under 35 U.S.C. 154(b) by 270 days.

(21) Appl. No.: 11/223,185

(22) Filed: Sep. 9, 2005

(65) Prior Publication Data

US 2006/0207824 A1    Sep. 21, 2006

(30) Foreign Application Priority Data

Mar. 18, 2005  (JP) ............................. 2005-080283
Mar. 18, 2005  (JP) ............................. 2005-080291

(51) Int. Cl.
    *B62K 21/18*    (2006.01)
(52) U.S. Cl. ..................................... 180/444
(58) Field of Classification Search ................ 180/443, 180/444, 446; 403/1
    See application file for complete search history.

(56) References Cited

U.S. PATENT DOCUMENTS

| | | | | |
|---|---|---|---|---|
| 1,797,296 A | * | 3/1931 | Ray ............................ 403/259 |
| 2,154,663 A | * | 4/1939 | Camp .......................... 74/505 |
| 3,618,376 A | * | 11/1971 | Shull et al. ............. 73/862.045 |
| 4,767,230 A | * | 8/1988 | Leas, Jr. ...................... 403/16 |
| 5,144,861 A | * | 9/1992 | Nishijima et al. ............. 74/552 |
| 5,195,383 A | * | 3/1993 | Tanaka et al. .......... 73/862.325 |
| 5,201,541 A | * | 4/1993 | Jones et al. .................. 280/731 |
| 5,253,730 A | | 10/1993 | Hayashi et al. |
| 5,409,256 A | * | 4/1995 | Gordon et al. ........... 280/728.2 |
| 5,544,545 A | * | 8/1996 | Sanders et al. ................ 74/552 |
| 5,692,770 A | * | 12/1997 | Scharboneau et al. ..... 280/728.2 |
| 5,738,370 A | * | 4/1998 | Hosoi et al. ................. 280/731 |
| 5,816,112 A | * | 10/1998 | Hosoi et al. .................... 74/552 |
| 5,921,147 A | * | 7/1999 | Nagata et al. ................. 74/552 |
| 5,941,131 A | | 8/1999 | Fohl |
| 6,006,854 A | | 12/1999 | Nakajima |
| 6,546,828 B2 | * | 4/2003 | Hobaugh, II .................. 74/552 |
| 6,913,107 B2 | * | 7/2005 | Sato et al. .................... 180/402 |
| 7,216,733 B2 | * | 5/2007 | Iwami et al. ................ 180/68.1 |
| 2003/0197360 A1 | * | 10/2003 | Shimizu ..................... 280/771 |

FOREIGN PATENT DOCUMENTS

JP    HEI 02-193790 A        7/1990
JP        09011962 A   *    1/1997

* cited by examiner

*Primary Examiner*—Kevin Hurley
(74) *Attorney, Agent, or Firm*—Orum & Roth LLC

(57) ABSTRACT

In a motor-driven steering apparatus in which a handle stay provided with a steering handle is fixed to a steering shaft, and a motor-driven steering assist unit is interposed between the steering shaft and a tire wheel side steering member, and a taper coupling portion provided in the handle stay is coupled and fixed to a taper support portion provided in the steering shaft.

16 Claims, 9 Drawing Sheets

MOTOR-DRIVEN STEERING APPARATUS

BACKGROUND OF THE INVENTION

1. Field of the Invention

The present invention relates to a motor-driven steering apparatus.

2. Description of the Related Art

In a motor-driven steering apparatus, as described in Japanese Patent Application Laid-open No. 2-193790 (patent document 1), there is a structure in which a handle stay provided with a steering handle is fixed to a steering shaft, and a motor-driven steering assist unit is interposed between the steering shaft and a tire wheel side steering member.

In the motor-driven steering apparatus in the patent document 1, the handle stay is coupled and fixed to a spline or the like provided in the steering shaft. Accordingly, in order to attach the handle stay to the steering shaft at a right neutral position having a right attaching angle of the handle stay with respect to the steering shaft when connecting the handle stay to the steering shaft at the neutral position in a steering direction to the right and the left, it is necessary to repeatedly set in and pull out the handle stay with respect to the spline of the steering shaft. This is a complicated procedure.

Further, it is impossible to make a regulating range of the position of the attaching angle of the handle stay with respect to the steering shaft smaller than one pitch interval between teeth of the spline or the like, and a fine adjustment can not be achieved.

Displacement of a position of an actual attaching angle with respect to a right neutral position of the handle stay is difficult to realize in a round steering handle. However, this displacement appears significantly in an exaggerated manner in both end grip portions of a bar handle of a saddle riding type vehicle or the like because the extending length of the handlebars to the right and the left is long.

In this case, in the saddle riding type vehicle having a bar handle, it is desirable to prevent the bar handle exposed to an external force from rotating with respect to the steering shaft when the vehicle is inverted.

SUMMARY OF THE INVENTION

An object of the present invention is to simply attach a steering stay provided with a steering handle to a position of a right attaching angle with respect to a steering shaft, in a motor-driven steering apparatus.

Further, an object of the present invention is to simply attach a handle stay provided with a bar handle to a position of a right attaching angle with respect to the steering shaft, and to prevent the handle stay from rotating with respect to the steering shaft, in the motor-driven steering apparatus.

The present invention relates to a motor-driven steering apparatus in which a handle stay provided with a steering handle is fixed to a steering shaft, and a motor-driven steering assist unit is interposed between the steering shaft and a tire wheel side steering member. A taper coupling portion provided in the handle stay is coupled and fixed to a taper support portion provided in the steering shaft.

The present invention relates to a motor-driven steering apparatus in which a handle stay provided with a bar handle is fixed to a steering shaft, and a motor-driven steering assist unit is interposed between the steering shaft and a tire wheel side steering member. A taper coupling portion provided in the handle stay is coupled and fixed to a taper support portion provided in the steering shaft. An inhibited portion provided in the handle stay is made to freely engage with a rotation inhibiting portion provided in the steering shaft around the steering shaft, thereby preventing the bar handle from freely rotating.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Embodiment 1

Figure 1:
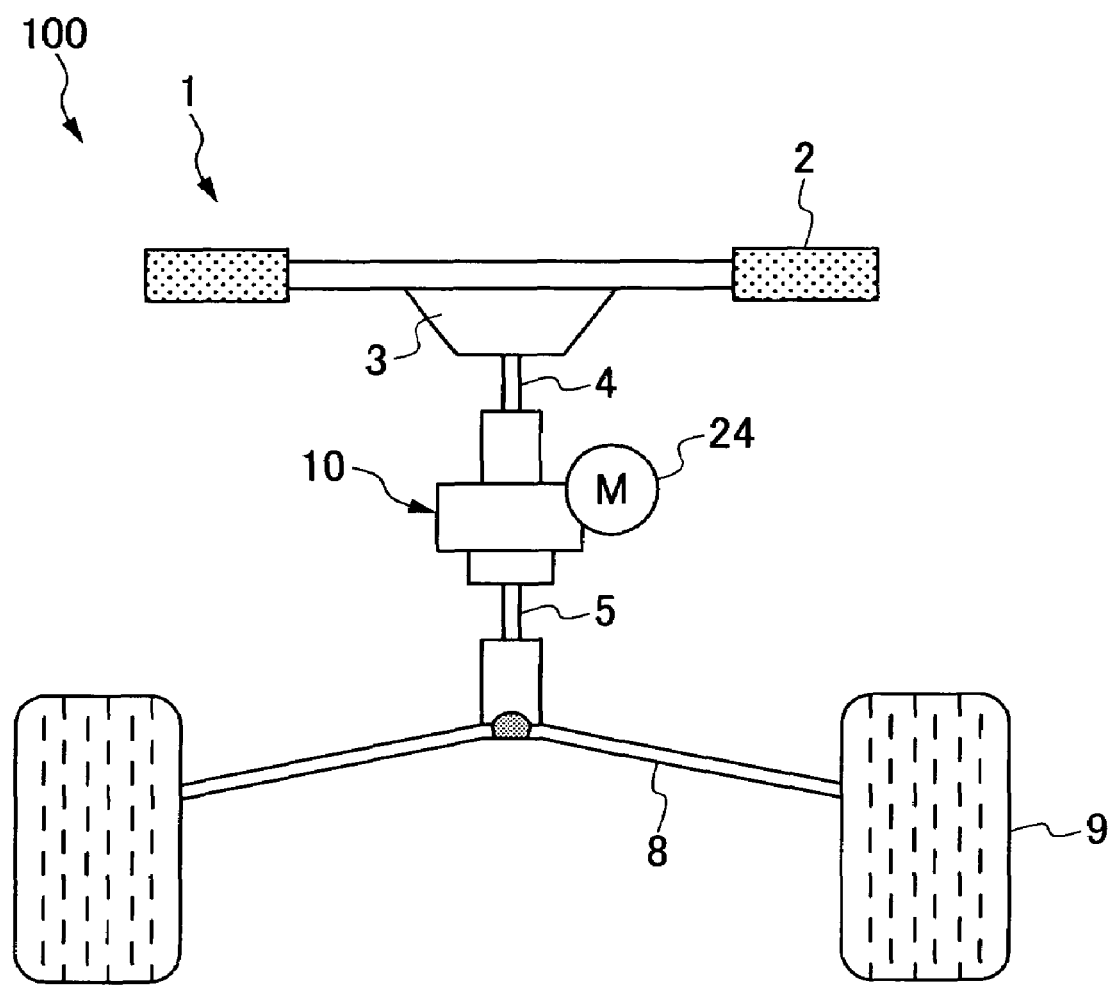
FIG. 1 is a schematic view showing a saddle riding type vehicle.

A saddle riding type vehicle 100 in FIG. 1 is used as a rough road traveling vehicle such as a buggy vehicle, a snowmobile or the like, and has a motor-driven steering apparatus 1. The motor-driven steering apparatus 1 is structured such that a handle stay 3 provided with a bar handle 2 serving as a steering handle is fixed to a steering shaft 4 in the manner mentioned below, and a motor-driven steering assist unit 10 is interposed between the steering shaft 4 and a tire wheel side steering member 5.

Figure 2:
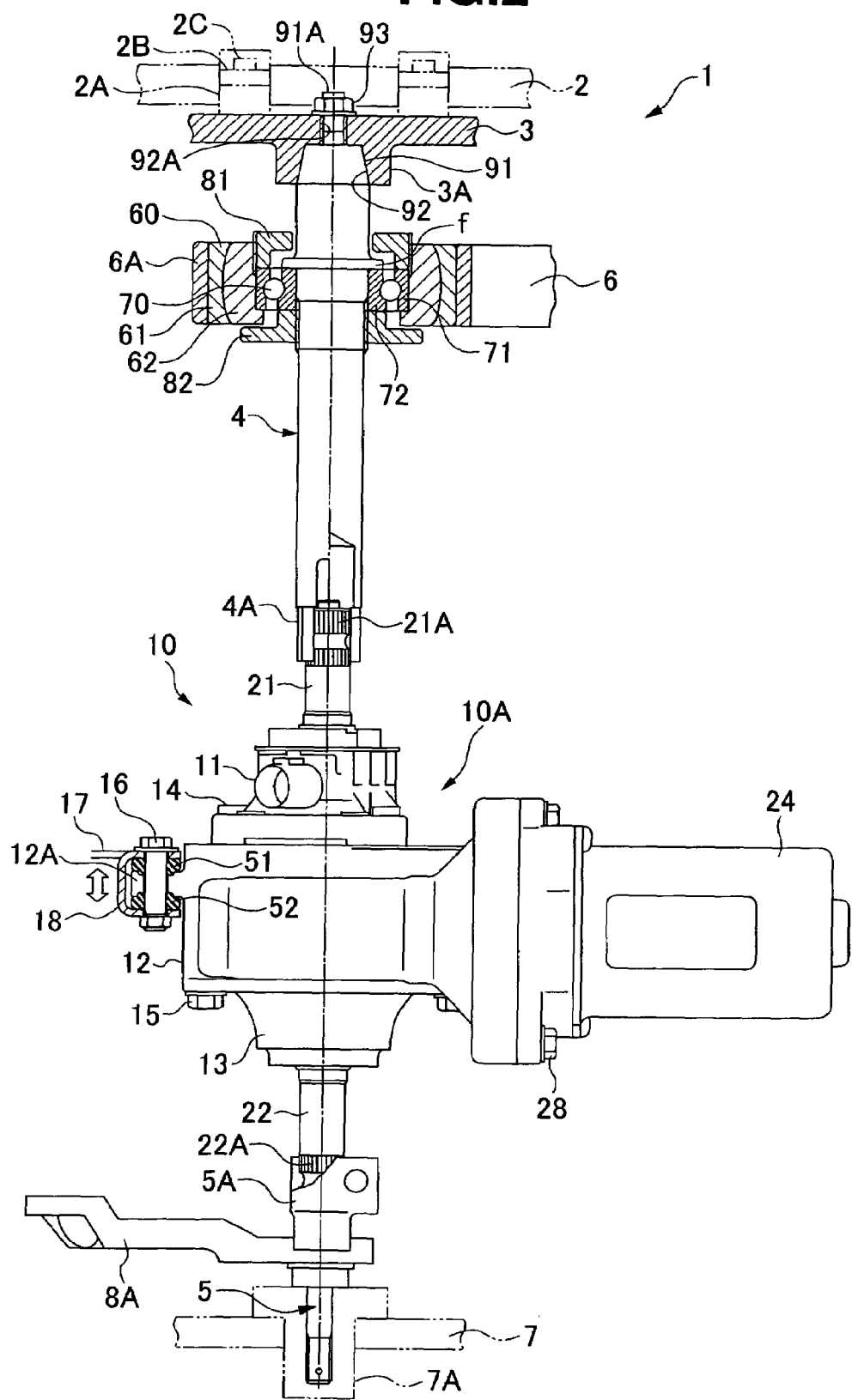
FIG. 2 is a schematic view showing a motor-driven steering apparatus in accordance with an embodiment 1.

The motor-driven steering apparatus 1 is structured, as shown in FIG. 2, such that the steering shaft 4 is rotatably supported to a support member 6A of an upper vehicle body side stay 6 via a bearing mentioned below. The tire wheel side steering member 5 is rotatably supported to a support member 7A of a lower vehicle body side stay 7 via a bearing, and a pitman arm 8A is fixed to an intermediate portion thereof. The pitman arm 8A is coupled to right and left front wheels 9 via right and left tie rods 8. The upper and lower vehicle body side stays 6 and 7 are supported to a vehicle body frame.

Figure 3:
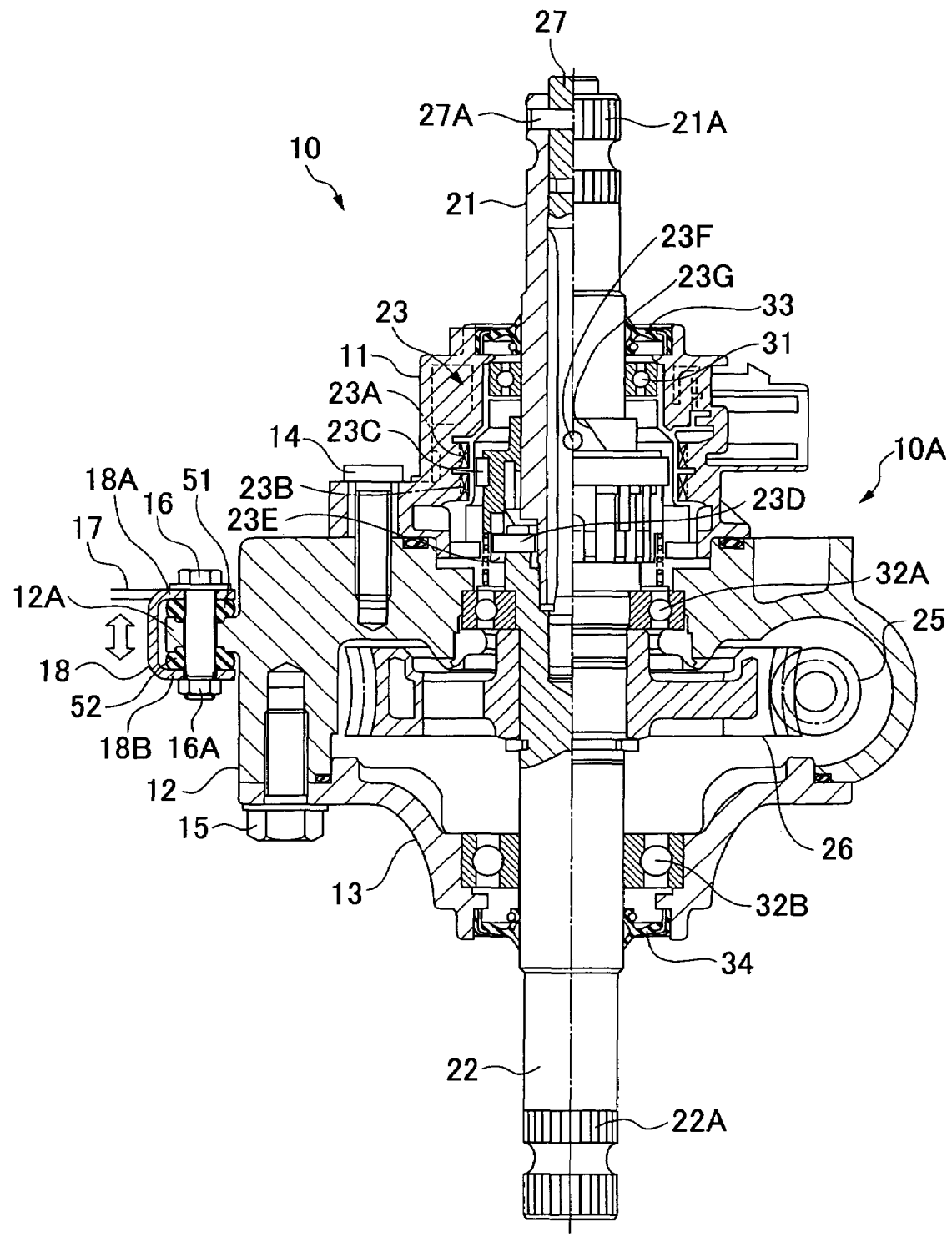
FIG. 3 is a schematic view showing a motor-driven steering assist unit.

The motor-driven steering assist unit 10 is structured by a single unit body 10A covered by first housing 11 (upper housing or upper cover), second housing (main housing), and third housing (lower housing or lower cover) 13, as shown in FIGS. 2 and 3. The unit body 10A has an input shaft 21, an output shaft 22, a torque sensor 23, an electric motor 24, a worm gear 25 and a worm wheel 26 built-in.

The motor-driven steering assist unit 10 is structured such that an upper end portion of the input shaft 21 to which the steering shaft 4 is connected by a connecting device 4A is supported to the first housing 11 (FIG. 3) by the bearing 31. Upper and lower end portions of the output shaft 22 to which the tire wheel side steering member 5 is connected by a connecting device 5A are supported to the second housing 12 and the third housing 13 by upper and lower bearings 32A and 32B (FIG. 3). The input shaft 21 is provided with a serration 21A for connection to the connecting device 4A in an upper end outer peripheral portion. The output shaft 22 is provided with a serration 22A for connecting to the connecting device 5A in a lower end outer peripheral portion. A torsion bar 27 is inserted to a hollow portion of the input shaft 21. One end of the torsion bar 27 is coupled to the input shaft 21 by a coupling pin 27A, and the other end of the torsion bar 27 is inserted in a hollow portion of the output shaft 22 so as to be connected by serration.

A torque sensor 23 is provided with two detecting coils 23A and 23B surrounding a cylindrical core 23C engaged with the input shaft 21 and the output shaft 22, in the first housing 11, as shown in FIG. 3. The core 23C is provided with a vertical groove 23E engaging with a guide pin 23D of the output shaft 22 so as to be movable only in an axial direction, and is provided with a spiral groove 23G engaging with a slider pin 23F of the input shaft 21. Accordingly, when a steering torque applied to the steering wheel is applied to the input shaft 21, and a relative displacement in a rotation direction is generated between the input shaft 21 and the output shaft 22 on the basis of an elastic torsional deformation of the torsion bar 27, the displacement in the rotation direction of the input shaft 21 and the output shaft 22 displaces the core 23C in an axial direction. An inductance of the detecting coils 23A and 23B caused by a magnetic change around the detecting coils 23A and 23B due to the displacement of the core 23C is changed. In other words, when the core 23C moves close to the input shaft 21, the inductance of the detecting coil 23A to which the core 23C moves close is increased, and the inductance of the detecting coil 23B from which the core 23C moves apart is reduced, whereby it is possible to detect the steering torque on the basis of the change of the inductance.

The electric motor 24 is attached and supported to the second housing 12 by a mounting bolt 28, and is driven by a controller (not shown) in correspondence to the detected torque of the torque sensor 23. A worm gear 25 is coupled to a rotation shaft of the electric motor 24 by a joint, and the worm wheel 26 engaging with the worm gear 25 is fixed to the output shaft 22. The worm gear 25 is supported at both ends to the second housing 12 by right and left bearings (not shown). The worm wheel 26 is fixed to the output shaft 22 just below an upper bearing 32A in the output shaft 22, in an inner portion of the second housing 12.

Accordingly, in the motor-driven steering assist unit 10, an integral unit body 10A is structured by supporting the upper end portion of the input shaft 21 and the torque sensor 23 to the first housing 11. The upper end portion of the output shaft 22, the electric motor 24, the worm gear 25 and the worm wheel 26 are supported by the second housing 12. The lower end portion of the output shaft 22 is supported by the third housing 13. The first housing 11 and the second housing 12 are coupled by the mounting bolt 14, and the second housing 12 and the third housing 13 are coupled by the mounting bolt 15. An oil seal 33 is attached in a sealing manner to an upper opening portion of the bearing 31 in the first housing 11, and an oil seal 34 is attached in a sealing manner to a lower opening portion of the bearing 32B in the third housing 13.

Further, the motor-driven steering assist unit 10 is structured such that the second housing 12 can be attached to the vehicle body side. The motor-driven steering assist unit 10 is structured, as shown in FIGS. 2 and 3, such that elastic members 51 and 52 such as a rubber bush or the like are provided in both sides of attaching bosses 12A provided at a plurality of positions, for example, three positions, in a peripheral direction of an outer periphery of the second housing 12. The attaching bosses 12A are pinched between upper and lower support pieces 18A and 18B of forked support portions 18 provided at a plurality of positions corresponding to the attaching bosses 12A of the vehicle body side attaching stay 17 via the elastic members 51 and 52. The attaching boss 12A is pinched in a floating fixed state between the upper and lower support pieces 18A and 18B via the elastic members 51 and 52 by the support pieces 18A and 18B of the forked support portion 18, the elastic members 51 and 52, and an attaching bolt 16 (a nut 16A) inserted and attached to a bolt hole provided in each of the attaching bosses 12A. The vehicle body side bracket 17 is supported to the vehicle body frame.

Connecting workability between the steering shaft 4 and the input shaft 21 of the motor-driven steering assist unit 10 may be improved when supporting the steering shaft 4 to the support member 6A of the vehicle body side stay 6 and supporting the motor-driven steering assist unit 10 to the vehicle body side bracket 17. To prevent a pull-up or push-down load in an axial direction applied to the steering shaft 4 from the bar handle 2 from being applied to the torque sensor 23 via the input shaft 21, the motor-driven steering apparatus 1 is structured such that a spherical sliding bearing 60 is attached to the support member 6A of the vehicle body side stay 6, and the steering shaft 4 is supported to a bearing 70 fixed to an inner periphery of the spherical sliding bearing 60 so as to be rotatable and immobile in an axial direction.

The spherical sliding bearing 60 can simultaneously apply a radial load and thrust loads in both directions, an upward direction and a downward direction, of the steering shaft 4. It is structured such that an outer peripheral spherical surface of an inner ring 62 is brought into spherical contact with an inner peripheral spherical surface of an outer ring 61 via a lubricating liner. The bearing 70 comprises, for example, an angular contact ball bearing which can simultaneously apply the radial load and the thrust load of the steering shaft 4.

The spherical sliding bearing 60 is structured such that the outer ring 61 is immobilized to an inner periphery of the annular support member 6A of the vehicle body side stay 6 by a press-fit procedure or other means. The outer ring 71 of the bearing 70 is inserted to an inner periphery of the inner ring 62 of the spherical surface sliding bearing 60, and one end surface of the outer ring 71 of the bearing 70 is brought into contact with an inner peripheral step portion of the inner ring 62 of the spherical surface sliding bearing 60. The other end surface of the outer ring 71 is pressed by a nut 81 screwed with the inner periphery of the inner ring 62, and the outer ring 71 is pinched and fixed between the nut 81 and the inner peripheral step portion of the inner ring 62. Where the steering shaft 4 is inserted to the inner ring 72 of the bearing 70, and one end surface of the inner ring 72 is brought into contact with a collar portion f provided in an intermediate portion of the steering shaft 4, the other end surface of the inner ring 72 is pressed by a nut 82 screwed into the steering shaft 4, and the inner ring 72 is pinched and fixed between the nut 82 and the collar portion f of the steering shaft 4.

In this case, the outer ring 61 of the spherical surface sliding bearing 60 may be structured by the support member 6A itself of the vehicle body side stay 6.

Further, in order to make it possible to simply attach the handle stay 3 provided with the bar handle 2 to a position of a right attaching angle with respect to the steering shaft 4, the motor-driven steering apparatus 1 is provided with the following structure. In this case, the right and left lower holders 2A shown in FIG. 4 are fixed to the handle stay 3, the intermediate portion of the bar handle 2 is mounted on the lower holders 2A, and the right and left upper holders 2B covered from the above are fixed to the handle stay 3 by the bolts 2C, so that the bar handle 2 is attached to the handle stay 3.

Figure 4:
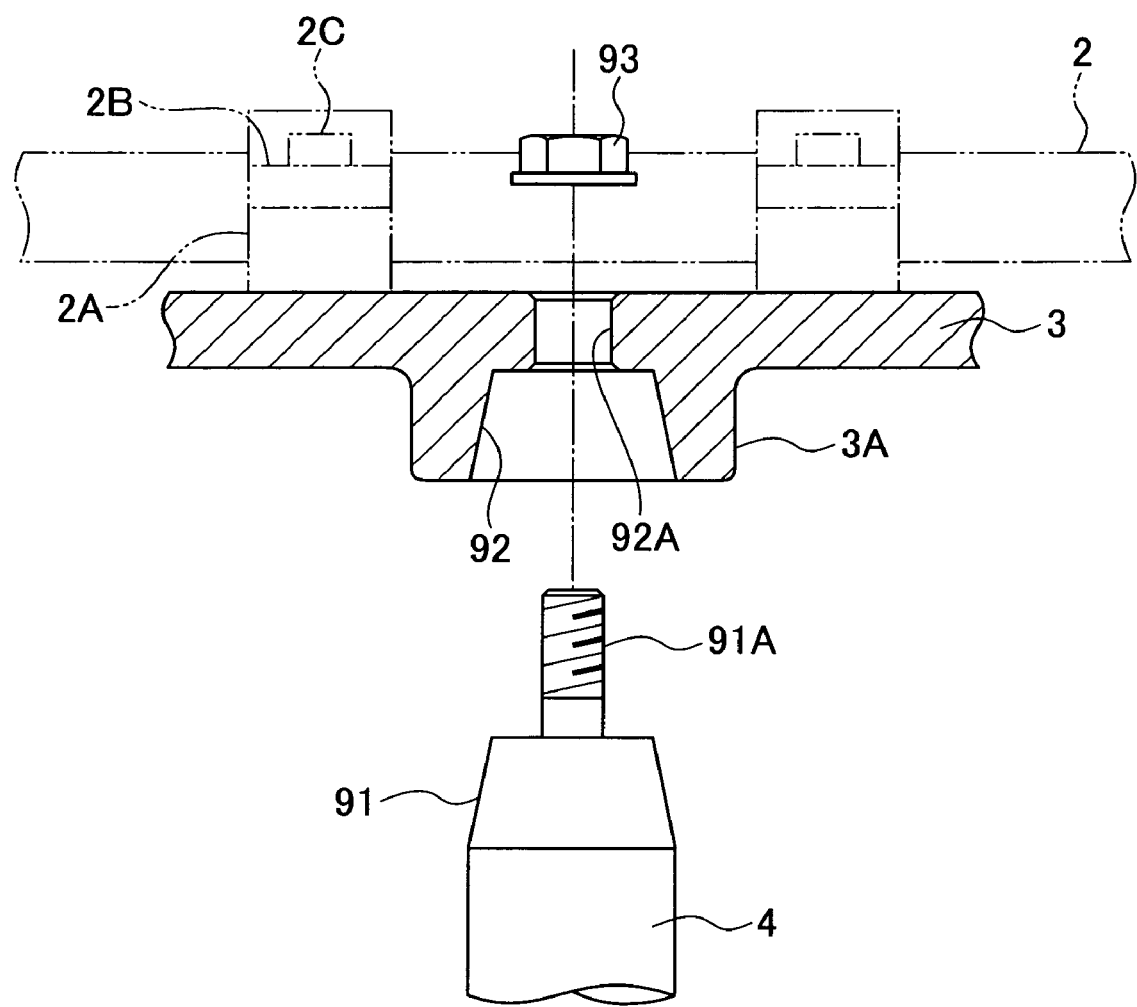
FIG. 4 is a schematic view showing a handle stay and a steering shaft in accordance with the embodiment 1.

The motor-driven steering apparatus 1 is structured, as shown in FIGS. 2 and 4, such that a taper hole 92 serving as a taper coupling portion with which the handle stay 3 is provided in the lower surface tubular boss 3A is coupled to a taper shaft 91 serving as a taper support portion with which the steering shaft 4 is provided in the upper end side. The taper shaft 91 is provided with a taper outer peripheral surface, the taper hole 92 is provided with a taper inner peripheral surface, and the tapers are formed in a small taper such as ⅛, 1/10 or the like so as to be easily accommodated.

In the drawing figure, the lead line for element 91 points to the taper shaft, which has the taper support portion. The taper shaft has a taper outer peripheral surface which is also pointed out by the lead line.

The motor-driven steering apparatus 1 is structured such that in a state in which the taper hole 92 of the handle stay 3 is coupled to the taper shaft 91 of the steering shaft 4, a male thread portion 91A coaxially provided with the taper shaft 91 in an upper end surface of the taper shaft 91 in the steering shaft 4 is passed through an insertion hole 92A coaxially provided with the taper hole 92 in the handle stay 3, a nut 93 is fastened to an end portion protruding from the insertion hole 92A of the male thread portion 91A, and the taper shaft 91 and the taper hole 92 are fastened up so as to be fixed.

Accordingly, the handle stay 3 provided with the bar handle 2 is attached to the steering shaft 4 in the following manner.

(1) The bar handle 2 is attached to the handle stay 3.

(2) The taper hole 92 of the handle stay 3 is lightly inserted to the taper shaft 91 of the steering shaft 4.

At this time, the steering shaft 4 is set to a neutral position in the steering direction to the right and the left.

(3) If the position of the attaching angle with respect to the steering shaft 4 of the handle stay 3 is shifted from the right position by comparing the extending direction to the right and the left of the bar handle 2 in a forward and backward direction of the vehicle 100 or the like, the position of the taper hole 92 of the handle stay 3 is regulated by turning the taper hole 92 without pulling out or pushing in the taper hole 92 with respect to the taper shaft 91 of the steering shaft 4.

(4) If the position of the attaching angle of the handle stay 3 is determined to the right position, the nut 93 is fastened to the male thread portion 91A of the steering shaft 4 protruding from the insertion hole 92A of the handle stay 3 and the taper hole 92 of the handle stay 3 is fastened up with respect to the taper shaft 91 of the steering shaft 4 so as to be fully fastened and fixed as it is.

In the motor-driven steering apparatus 1, the steering torque applied to the bar handle 2 is detected by the torque sensor 23, the electric motor 24 is driven on the basis of the detected torque, and the torque generated by the electric motor 24 is transmitted to the output shaft 22 via the worm gear 25 and the worm wheel 26. Accordingly, the torque generated by the electric motor 24 can be used as an assist force for the steering force which the driver applies to the bar handle 2.

In accordance with the present embodiment, the following operations and effects can be achieved.

(a) Since it is sufficient to regulate the position of the taper hole 92 of the handle stay 3 by turning the taper hole 92 as it is without pulling out and pushing in the taper hole 92 with respect to the taper shaft 91 of the steering shaft 4 and fully fasten and fix the taper hole 92 of the handle stay 3 with respect to the taper shaft 91 of the steering shaft 4, a simple structure is obtained.

(b) Since it is possible to regulate the position of the attaching angle with respect to the steering shaft 4 of the handle stay 3 by continuously turning the taper hole 92 of the handle stay 3 with respect to the taper shaft 91 of the steering shaft 4 as it is, it is possible to continuously regulate the taper hole 92.

(c) In the bar handle 2 in which the displacement of the position of the actual attaching angle of the handle stay 3 with respect to the right neutral position noticeably appears, the displacement of the position of the attaching angle can be simply regulated on the basis of the items (a) and (b) mentioned above.

(d) In the saddle riding type vehicle 100, the items (a) to (c) can be advantageously achieved.

Figure 5:
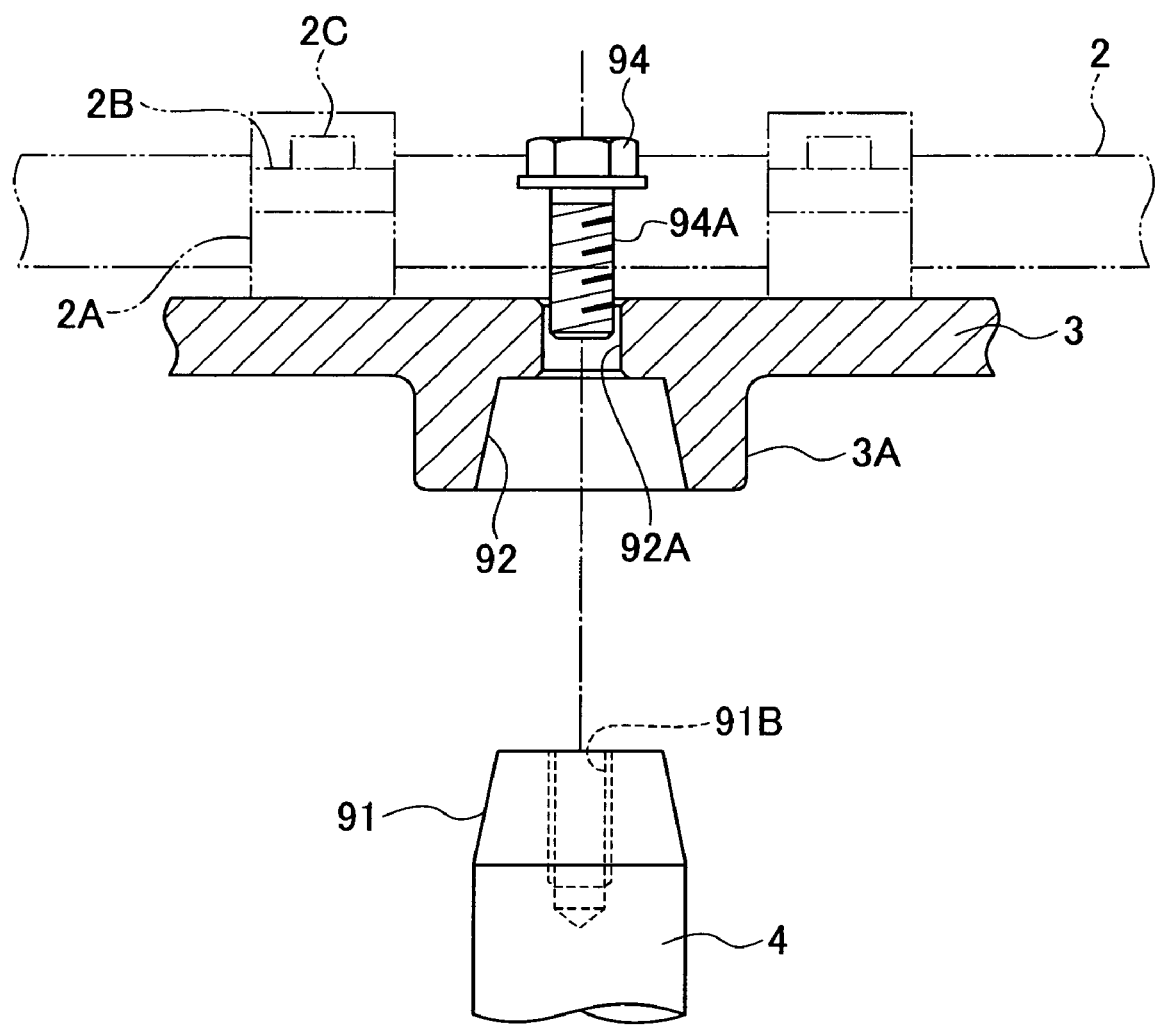
FIG. 5 is a schematic view showing a modified embodiment of the handle stay and the steering shaft in accordance with the embodiment 1.

In this case, the fixing structure between the taper shaft 91 and the taper hole 92 in the motor-driven steering apparatus 1 may include a structure shown in FIG. 5. In other words, where the taper hole 92 of the handle stay 3 is coupled to the taper shaft 91 of the steering shaft 4, a bolt 94 is passed through the insertion hole 92A coaxially formed with the taper hole 92 of the handle stay 3, a male thread portion 94A protruding from the insertion hole 92A of the bolt 94 is fastened to a female thread portion 91B coaxially formed with the taper shaft 91 in the steering shaft 4, and the taper shaft 91 and the taper hole 92 are fastened up and fixed.

Embodiment 2

A description will be given of a motor-driven steering apparatus 1 in accordance with an embodiment 2.

In this case, the same reference numerals are attached to substantially the same elements of the embodiment 2 as those of the embodiment 1, and a description thereof will be omitted.

The motor-driven steering apparatus 1 in accordance with the embodiment 2 is provided with the following structure for preventing the handle stay 3 from rotating with respect to the steering shaft 4.

Figure 6:
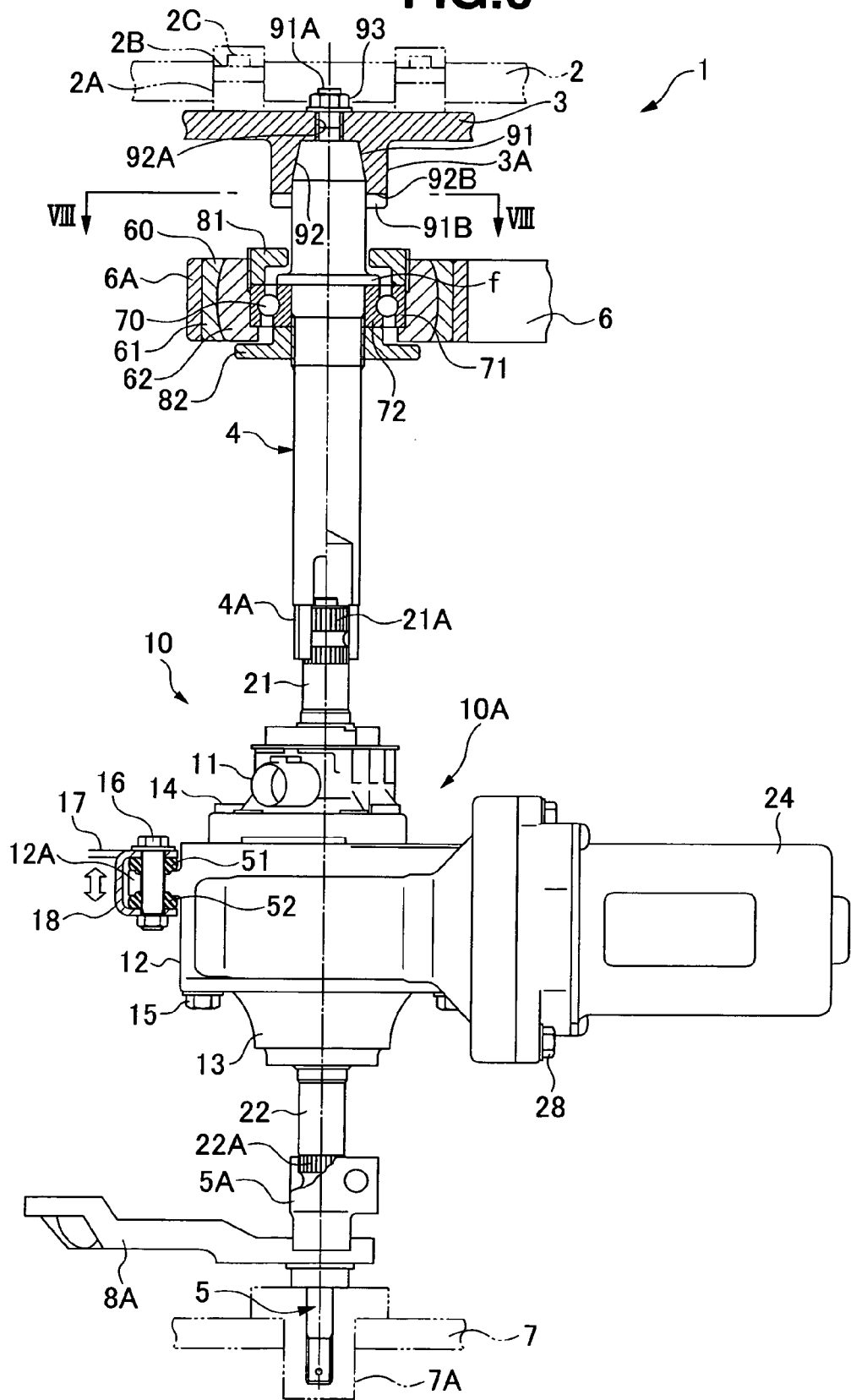
FIG. 6 is a schematic view showing a motor-driven steering apparatus in accordance with an embodiment 2.
Figure 7:
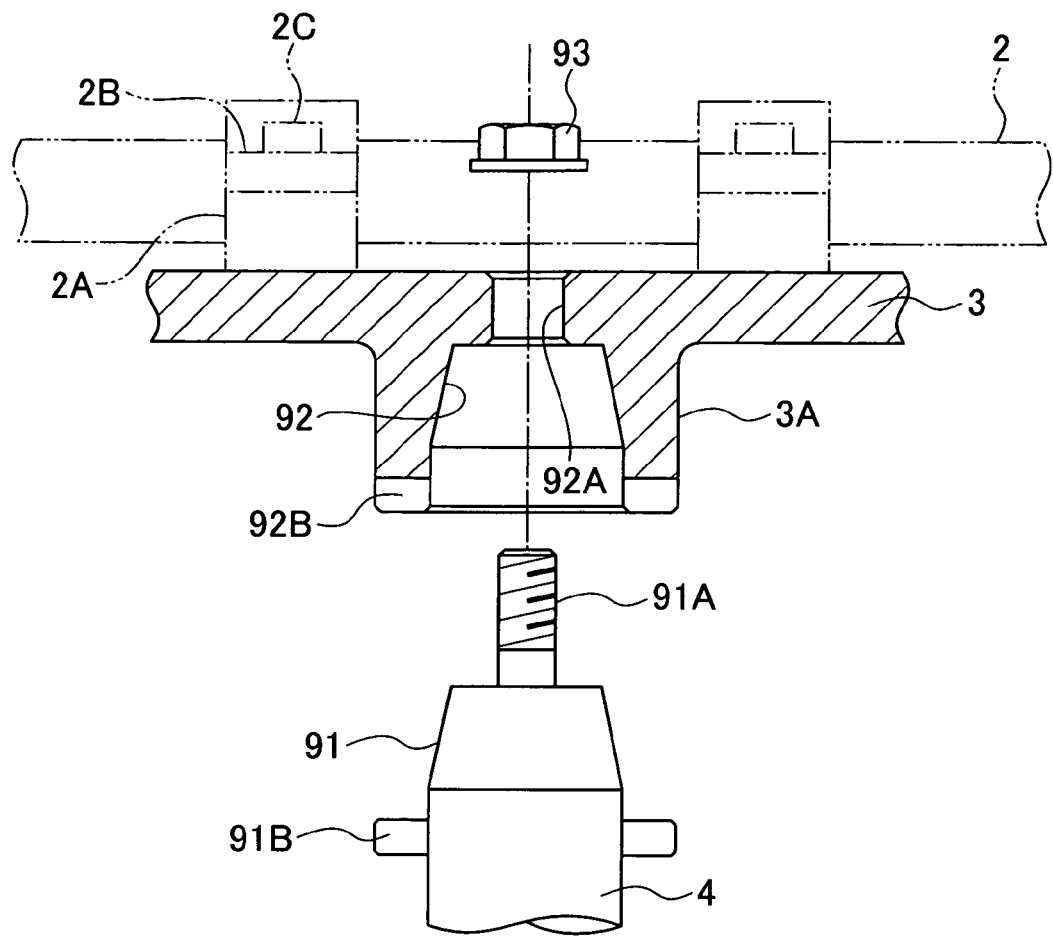
FIG. 7 is a schematic view showing a handle stay and a steering shaft in accordance with the embodiment 2.
Figure 8:
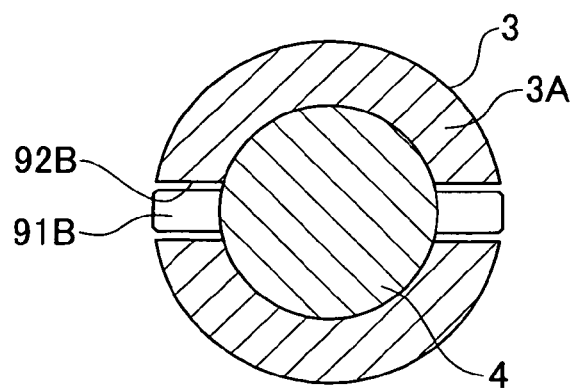
FIG. 8 is a cross sectional view along a line VIII-VIII in FIG. 6.

The motor-driven steering apparatus 1 has a rotation inhibiting pin 91B protruding in an axial perpendicular direction of the steering shaft 4 on a diameter just below an outer periphery of the taper shaft 91 of the steering shaft 4, as a rotation inhibiting portion provided in the steering shaft 4, as shown in FIGS. 6, 7 and 8. Further, the motor-driven steering apparatus 1 has a inhibited groove 92B inscribed on the diameter just below the taper hole 92 in the lower surface tubular boss 3A of the handle stay 3, as an inhibited portion provided in the handle stay 3.

The motor-driven steering apparatus 1 makes the inhibited groove 92B of the handle stay 3 freely engage with the rotation inhibiting pin 91B of the steering shaft 4 around the steering shaft 4 in a state of coupling the taper hole 92 of the handle stay 3 to the taper shaft 91 of the steering shaft 4, thereby preventing the bar handle 2 from freely rotating. At this time, the rotation inhibiting pin 91B and the inhibited groove 92B are structured, as shown in FIG. 8, such that a groove width of the groove 92B is set larger than a diameter of the pin 91B, and is engaged with and inserted to each other around the steering shaft 4 via a clearance.

Accordingly, the handle stay 3 provided with the bar handle 2 is attached to the steering shaft 4 in the following manner.

(1) The bar handle 2 is attached to the handle stay 3.

(2) The taper hole 92 of the handle stay 3 is lightly inserted to the taper shaft 91 of the steering shaft 4. At the same time, the inhibited groove 92B of the handle stay 3 is engaged with the rotation inhibiting pin 91B of the steering shaft 4.

At this time, the steering shaft 4 is set to a neutral position in the steering direction to the right and the left.

(3) If the position of the attaching angle with respect to the steering shaft 4 of the handle stay 3 is shifted from the right position by comparing the extending direction to the right and the left of the bar handle 2 in a forward and backward direction of the vehicle 100 or the like, the position of the taper hole 92 of the handle stay 3 is regulated by turning the taper hole 92 without pulling out or pushing in the taper hole 92 with respect to the taper shaft 91 of the steering shaft 4.

(4) If the position of the attaching angle of the handle stay 3 is determined to the right position, the nut 93 is fastened to the male thread portion 91A of the steering shaft 4 protruding from the insertion hole 92A of the handle stay 3 and the taper hole 92 of the handle stay 3 is fastened up with respect to the taper shaft 91 of the steering shaft 4 so as to be fully fastened and fixed as it is.

In the motor-driven steering apparatus 1, the steering torque applied to the bar handle 2 is detected by the torque sensor 23, the electric motor 24 is driven on the basis of the detected torque, and the torque generated by the electric motor 24 is transmitted to the output shaft 22 via the worm gear 25 and the worm wheel 26. Accordingly, the torque generated by the electric motor 24 can be used as an assist force for the steering force which the driver applies to the bar handle 2.

In accordance with the present embodiment, the following operations and effects can be achieved.

(a) Since it is sufficient to regulate the position of the taper hole 92 of the handle stay 3 by turning the taper hole 92 as it is without pulling out and pushing in the taper hole 92 with respect to the taper shaft 91 of the steering shaft 4 and fully fasten and fix the taper hole 92 of the handle stay 3 with respect to the taper shaft 91 of the steering shaft 4, a simple structure is obtained.

(b) Since it is possible to regulate the position of the attaching angle with respect to the steering shaft 4 of the handle stay 3 by continuously turning the taper hole 92 of the handle stay 3 with respect to the taper shaft 91 of the steering shaft 4 as it is, it is possible to continuously regulate the taper hole 92.

(c) In the bar handle 2 in which the displacement of the position of the actual attaching angle of the handle stay 3 with respect to the right neutral position noticeably appears, the displacement of the position of the attaching angle can be simply regulated on the basis of the items (a) and (b) mentioned above.

(d) The inhibited groove 92B (the inhibited portion) of the handle stay 3 is made to freely engage with the rotation inhibiting pin 91B (the rotation inhibiting portion) of the steering shaft 4 around the steering shaft 4. It is possible to prevent the bar handle 2 from rotating with respect to the steering shaft 4 when the vehicle 100 is inverted.

(e) Since the clearance is provided between the rotation inhibiting pin 91B of the steering shaft 4 and the inhibited groove 92B of the handle stay 3, the regulating work of the position of the attaching angle of the handle stay 3 in accordance with items (a) and (b) mentioned above is not prevented, even if the rotation inhibiting pin 91B exists.

(f) In the saddle riding type vehicle 100, the items (a) to (e) can be advantageously achieved.

Figure 9:
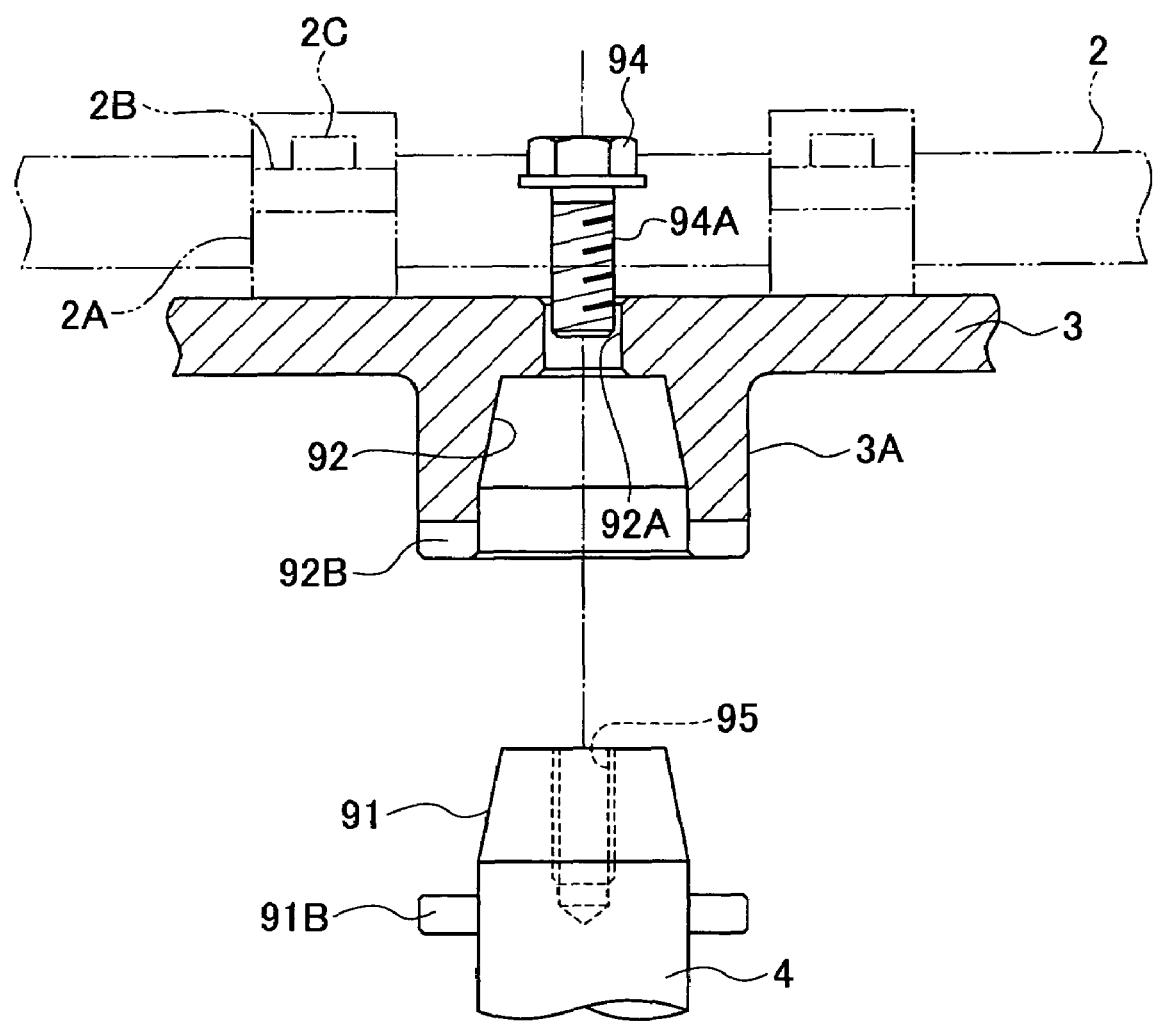
FIG. 9 is a schematic view showing a modified embodiment of the handle stay and the steering shaft in accordance with the embodiment 2.
Figure 10:
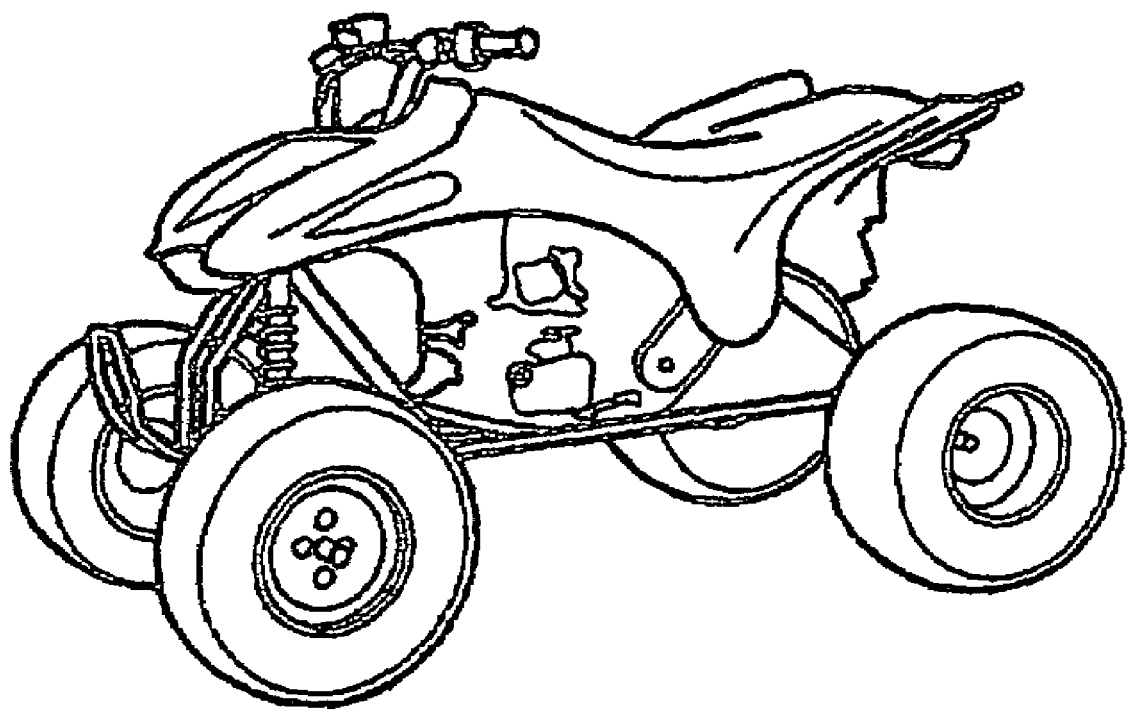
Figure 11:
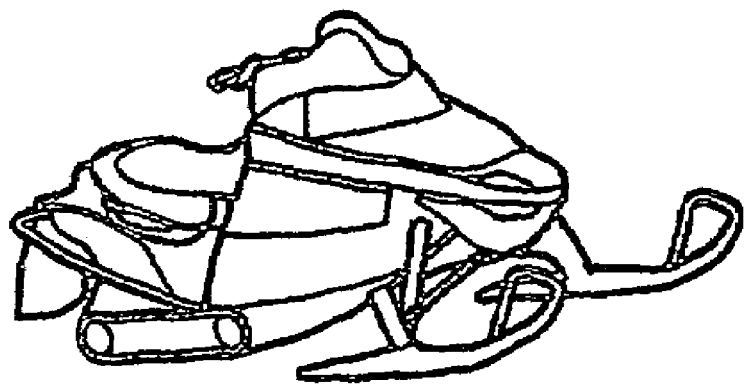

In this case, the fixing structure between the taper shaft 91 and the taper hole 92 in the motor-driven steering apparatus 1 may include a structure shown in FIG. 9. In other words, where the taper hole 92 of the handle stay 3 is coupled to the taper shaft 91 of the steering shaft 4, a bolt 94 is passed through the insertion hole 92A coaxially formed with the taper hole 92 of the handle stay 3, a male thread portion 94A protruding from the insertion hole 92A of the bolt 94 is fastened to a female thread portion 91B coaxially formed with the taper shaft 91 in the steering shaft 4, and the taper shaft 91 and the taper hole 92 are fastened up and fixed.

As mentioned above, in accordance with the present invention, in a state in which the taper hole (the taper coupling portion) of the handle stay is lightly inserted to the taper shaft (the taper support portion) of the steering shaft, the position of the attaching angle with respect to the steering shaft of the handle stay is confirmed. If the position of the attaching angle of the handle stay is shifted from the right position, the position is regulated by turning the taper hole of the handle stay as it is without pulling out and pushing in the taper hole with respect to the taper shaft of the steering shaft. Further, if the position of the attaching angle of the handle stay is determined at the right position, the taper hole of the handle stay is fully fastened and fixed to the taper shaft of the steering shaft as it is. Accordingly, a simple structure is obtained.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the taper coupling portion provided in the handle stay 3 may be set to the taper shaft, and the taper support portion provided in the steering shaft 4 may be set to the taper hole. Further, the inhibited portion of the handle stay 3 may be set to the pin, and the rotation inhibiting portion of the steering shaft 4 may be set to the groove.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven steering apparatus in which a handle stay provided with a steering handle is fixed to a steering shaft, and a motor driven steering assist unit is interposed between the steering shaft and a tire wheel side steering member, wherein a taper coupling portion having a smooth taper inner peripheral surface provided in the handle stay is coupled and fixed to a taper support portion having a smooth taper outer peripheral surface provided in the steering shaft, the taper coupling portion and the taper support portion mating against each other around a full 360 degrees and being infinitely adjustable with respect to each other around a full 360 degrees.

2. A motor driven steering apparatus as claimed in claim 1, wherein the taper support portion of the steering shaft is a taper shaft, the taper coupling portion of the handle stay is a taper hole, a male thread portion coaxially formed with the taper shaft in the steering shaft is passed through an insertion hole coaxially formed with the taper hole of the handle stay such that the taper hole of the handle stay is coupled to the taper shaft of the steering shaft, and a nut is fastened to an end portion protruding from the insertion hole of the male thread portion.

3. A motor driven steering apparatus as claimed in claim 1, wherein the taper support portion of the steering shaft is taper shaft, the taper coupling portion of the handle stay is set to a taper hole, a bolt is passed through an insertion hole coaxially formed with the taper hole of the handle stay such that the taper hole of the handle stay is coupled to the taper shaft of the steering shaft, and a male portion protruding from the insertion hole of the bolt is fastened to a female thread portion coaxially formed with the taper shaft in the steering shaft.

4. A motor driven steering apparatus as claimed in claim 1, wherein the steering handle comprises a bar handle.

5. A saddle riding vehicle comprising the motor driven steering apparatus as claimed in claim 1.

6. A saddle riding vehicle comprising the motor driven steering apparatus as claimed in claim 2.

7. A saddle riding vehicle comprising the motor driven steering apparatus as claimed in claim 3.

8. A saddle riding vehicle comprising the motor driven steering apparatus as claimed in claim 4.

9. A vehicle capable of traversing rough terrain comprising the motor driven steering apparatus as claimed in claim 1.

10. An off-road vehicle comprising the motor driven steering apparatus as claimed in claim 2.

11. A buggy vehicle comprising the motor driven steering apparatus as claimed in claim 3.

12. A buggy vehicle comprising the motor driven steering apparatus as claimed in claim 4.

13. A snowmobile comprising the motor driven steering apparatus as claimed in claim 1.

14. A snowmobile comprising the motor driven steering apparatus as claimed in claim 2.

15. A snowmobile comprising the motor driven steering apparatus as claimed in claim 3.

16. A snowmobile comprising the motor driven steering apparatus as claimed in claim 4.

* * * * *